US009932863B2

(12) United States Patent
Morris et al.

(10) Patent No.: US 9,932,863 B2
(45) Date of Patent: Apr. 3, 2018

(54) VEHICLE WASTE HEAT RECOVERY SYSTEM

(71) Applicant: Norgren Limited, Lichfield, Stafforshire (GB)

(72) Inventors: John Michael Morris, Auburn, WA (US); Mark Edwards Byers Sealy, Warwickshire (GB)

(73) Assignee: Norgren Limited, Lichfield (GB)

( * ) Notice: Subject to any disclaimer, the term of this patent is extended or adjusted under 35 U.S.C. 154(b) by 181 days.

(21) Appl. No.: 14/895,853

(22) PCT Filed: Jun. 27, 2014

(86) PCT No.: PCT/EP2014/063682
§ 371 (c)(1),
(2) Date: Dec. 3, 2015

(87) PCT Pub. No.: WO2014/207194
PCT Pub. Date: Dec. 31, 2014

(65) Prior Publication Data
US 2016/0123191 A1    May 5, 2016

Related U.S. Application Data

(60) Provisional application No. 61/840,870, filed on Jun. 28, 2013.

(51) Int. Cl.
| F02B 33/44 | (2006.01) |
| F01K 23/10 | (2006.01) |
| F01K 23/06 | (2006.01) |
| F02G 5/02  | (2006.01) |
| F01K 13/02 | (2006.01) |
| F02G 5/00  | (2006.01) |

(52) U.S. Cl.
CPC ............ *F01K 23/101* (2013.01); *F01K 13/02* (2013.01); *F01K 23/065* (2013.01); *F02G 5/00* (2013.01); *F02G 5/02* (2013.01); *Y02T 10/166* (2013.01)

(58) Field of Classification Search
CPC ...... F01K 13/02; F01K 23/065; F01K 23/101; F02G 5/00; F02G 5/02; F02G 2260/00; F02G 5/04; Y02T 10/166; Y02E 20/16
See application file for complete search history.

(56) References Cited

U.S. PATENT DOCUMENTS

| 3,765,447 A | * | 10/1973 | Cornell | ................ F16K 3/243 137/537 |
| 4,031,705 A |   | 6/1977  | Berg    |                                    |
| 4,060,990 A | * | 12/1977 | Guido   | .................... F01K 3/242 60/676 |
| 4,069,672 A |   | 1/1978  | Milling |                                    |

(Continued)

*Primary Examiner* — Jesse Bogue
(74) *Attorney, Agent, or Firm* — The Ollila Law Group LLC

(57) ABSTRACT

A waste heat recovery system (100) for an engine (101) comprises a fluid supply (104); one or more evaporators (120, 121) adapted to transfer waste heat from the engine (101) to fluid from the fluid supply (104) to heat the fluid to a superheated vapor; a condenser (134) having a condenser inlet (134') in fluid communication with the one or more evaporators; and a pressure regulator (200) configured to limit the vapor pressure at the condenser inlet (134').

8 Claims, 2 Drawing Sheets

(56) References Cited

U.S. PATENT DOCUMENTS

| | | | | | |
|---|---|---|---|---|---|
| 4,484,725 | A | * | 11/1984 | Yoshiga | ............... F16K 31/002 236/68 B |
| 5,174,327 | A | * | 12/1992 | Truax | .................... A62C 35/68 137/469 |
| 5,351,487 | A | * | 10/1994 | Abdelmalek | ............ B60K 6/24 60/618 |
| 2003/0180585 | A1 | * | 9/2003 | Gagnon | .................. C01B 3/382 429/423 |
| 2011/0203278 | A1 | | 8/2011 | Kopecek et al. | |

* cited by examiner

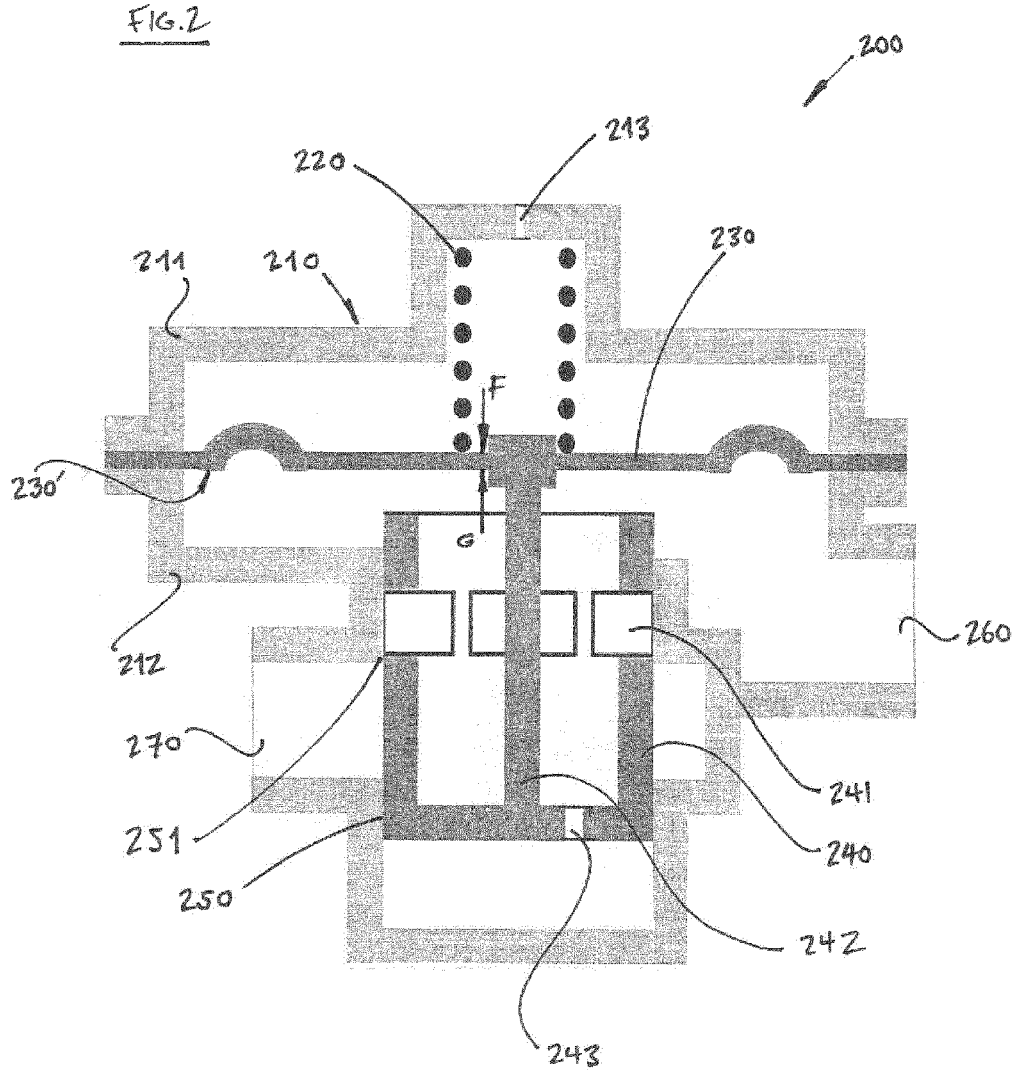

VEHICLE WASTE HEAT RECOVERY SYSTEM

TECHNICAL FIELD

The embodiments described below relate to, waste heat recovery systems, and more particularly, to a vehicle waste heat recovery system.

BACKGROUND

Internal combustion (IC) engines are used throughout the world and mainly for motor vehicles. IC engines account for one of the largest consumers of petroleum products known. Due to the large amount of petroleum products consumed by IC engines and the gases exhausted from IC engines, numerous regulatory agencies have implemented regulations or are in the process of implementing regulations that require minimum average fuel economy of vehicles as well as limit the amount of pollutants that are exhausted from vehicles.

Earlier attempts at reducing vehicle emissions have centered on exhaust gas treatments. For example, earlier attempts have introduced reagents into the exhaust gas stream prior to the gas passing through a catalyst in order to effect selective catalytic reduction (SCR) of the nitrogen oxides ($NO_x$) in the exhaust gases. Additionally, many vehicles now include exhaust gas recirculation (EGR) systems to recirculate at least some of the exhaust gases. Although EGR reduces the harmful emissions of vehicles, it also often reduces the vehicle's fuel economy.

The uses of SCR and EGR have been effective in reducing the emission problems in the exhaust stream, but have done little in improving the fuel economy and fuel consumption of vehicles. With the tighter regulations that are being implemented, many manufacturers have turned their focus to increasing the fuel economy of IC engines. It is generally known that only about thirty to forty percent of the energy produced by the fuel combustion of IC engines translates to mechanical power. Much of the remaining energy is lost in the form of heat. Therefore, one particular area of focus in the motor vehicle industry has been to recover some of the heat that is generated by the IC engine using a Rankine cycle.

While these prior art attempts have improved the vehicle's efficiency, they lack adequate control of the working fluid and the working fluid's temperature. For example, U.S. Pat. No. 4,031,705 discloses a heat recovery system that heats the working fluid using heat from the IC engine's exhaust and the IC engine's cooling circuit, i.e., the IC engine's radiator. Therefore, while the '705 patent does utilize multiple heat sources, there is no way to adequately control where the heat is being drawn from. This can be problematic at times since insufficient flow of working fluid to a heat source can reduce the overall efficiency of the heat recovery system and/or result in wet steam being fed to the expander.

An additional problem with the '705 patent is that the bypass circuit directs vapor directly into a condenser. Although this is typically not a problem for lower temperature and/or pressure vapors, as the temperature and/or pressure increases, the shock to the condenser caused by receiving superheated vapor can reduce the life expectancy of the condenser.

WO2014/060761 discloses a bypass system that, by injection of working fluid from a fluid supply, can cool superheated working fluid prior to its reaching a condenser so as to alleviate and reduce some of the thermal shock experienced by the condenser.

DISCLOSURE OF THE INVENTION

According to an aspect of the invention, a waste heat recovery system for an engine comprises:
a fluid supply;
one or more evaporators adapted to transfer waste heat from an engine to fluid from the fluid supply to heat the fluid to a superheated vapor;
a condenser having a condenser inlet in fluid communication with the one or more evaporators; and
a pressure regulator configured to limit the vapor pressure at the condenser inlet.

Employing a pressure limiting device at the inlet to a condenser protects that condenser from over-pressure. In a vehicle based waste heat recovery system, such high pressure spikes can result as the expansion machine is suddenly taken off-line or as a result of a control system failure. The cost of the condenser in a waste heat recovery system (Rankine Cycle) is highly affected by its pressure capacity. Accordingly, limiting the pressure applied to a condenser has a beneficial effect on its cost.

Preferably, the pressure regulator comprises a valve housing (210) having a valve inlet (270) in fluid communication with the one or more evaporators, a valve outlet (260) in fluid communication with the condenser and therebetween a valve member (240) moveable relative to the housing (210) in response to the pressure at the valve outlet (260).

Preferably, the pressure regulator comprises a diaphragm (230) kinematically connected to the valve member and subject to the pressure at the valve outlet.

Preferably, one side of the diaphragm (230) is subject to the pressure at the valve outlet (260) while the opposite side is subject to ambient pressure.

Preferably, the valve member (240) is pressure balanced in its direction of movement.

Preferably, the valve member (240) is balanced by the pressure at the valve outlet (260)

Preferably, the valve member is a spool (240) and the valve housing (210) comprises a bore 250 to accommodate the spool (240) for sliding movement.

Preferably, the bore (250) has at least one shoulder (251) and the spool (240) has at least one port (241) moveable relative thereto to regulate vapour flow through the valve.

Preferably, the spool has a passageway (243) to balance the pressure across the spool along its axis of movement.

Preferably, the valve member is subject to a bias force (F) in opposition to the pressure at the valve outlet.

Preferably, the pressure regulator comprises a spring (220) configured to apply a bias force (F) to the valve member (240).

BRIEF DESCRIPTION OF THE DRAWINGS

FIG. 2 is a diagrammatic sectional view of an embodiment of the condenser pressure limiting valve shown in FIG. 1.

DETAILED DESCRIPTION OF THE INVENTION

Figure 1:
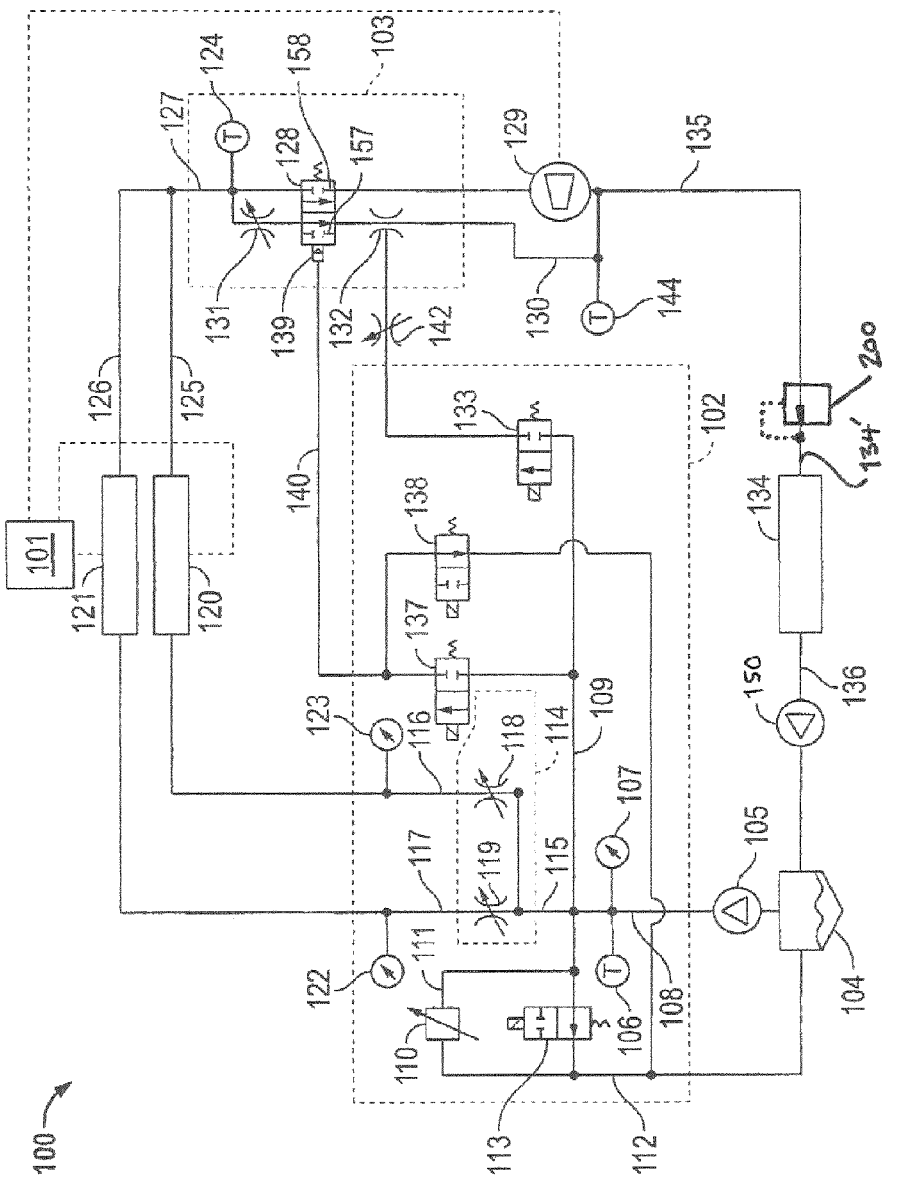
FIG. 1 shows a schematic of a waste heat recovery system for an engine according to an embodiment.

FIGS. 1 and 2 and the following description depict specific examples to teach those skilled in the art how to make and use the best mode of embodiments of a vehicle waste heat recovery system. For the purpose of teaching inventive principles, some conventional aspects have been simplified or omitted. Those skilled in the art will appreciate variations from these examples that fall within the scope of the present description. Those skilled in the art will appreciate that the features described below can be combined in various ways to form multiple variations of the vehicle waste heat recovery system. As a result, the embodiments described below are not limited to the specific examples described below, but only by the claims and their equivalents.

FIG. 1 shows a schematic of a waste heat recovery system 100 for an engine 101 according to an embodiment. The waste heat recovery system 100 may be implemented for an engine 101 of a motor vehicle (not shown), for example. Therefore, the engine 101 may comprise an IC engine, in particular a reciprocating piston engine. The vehicle may be an on-road truck, the operation of which is set out in the standard 'highway cycle' or World Harmonised Test Cycle (WHTC). Such a truck engine may particularly be powered by diesel or natural gas. According to an embodiment, the waste heat recovery system 100 can include a liquid control module 102 and a steam control module 103. According to an embodiment, the waste heat recovery system 100 includes a fluid supply 104. The fluid supply 104 may include a fluid, such as water, Freon®, ethanol, etc. The particular fluid used may vary from one application to another. For example, the fluid may be the fuel used by the engine 101.

A high-pressure fluid pump 105 is in fluid communication with an outlet of the fluid supply 104. The high-pressure fluid pump 105 may be driven by the engine 101 or may be driven by a separate electric motor, for example. The high-pressure fluid pump 105 can elevate the pressure of the fluid from a reservoir pressure to a higher threshold pressure. In some embodiments, the high-pressure fluid pump 105 may raise the pressure of the fluid to a threshold pressure of approximately 40 bar (580 psi) from the reservoir pressure, which is typically at atmospheric pressure. However, other threshold pressures are certainly possible and the particular example pressure should in no way limit the scope of the present embodiment. At the outlet of the high-pressure fluid pump 105, are optional temperature 106 and pressure 107 sensors. The temperature and pressure sensors 106, 107 are in fluid communication with the high-pressure fluid pump 105 via a fluid line 108.

According to an embodiment, the fluid line 108 can be in fluid communication with a plurality of other fluid lines via a line manifold 109, which are shown in FIG. 1 and will be described from left to right as shown in FIG. 1. According to an embodiment, the waste heat recovery system 100 can include a pressure control valve 110, which is in fluid communication with the line manifold 109 via a fluid line 111. The fluid line 111 branches off from the fluid line 108. The pressure control valve 110 can control the fluid pressure within the liquid control module 102 to ensure that the high-pressure fluid pump 105 does not over-pressurize the fluid in the liquid control module 102. In many embodiments, the high-pressure fluid pump 105 can pressurize the fluid to a higher pressure than is desired to be delivered to the rest of the system 100. Therefore, the pressure control valve 110 can regulate the fluid pressure in the liquid control module 102 so it does not exceed a threshold pressure. The pressure control valve 110 is further in fluid communication with the fluid supply 104 via a fluid line 112. According to an embodiment, the pressure control valve 110 may be controlled based on a predetermined set point pressure or may be actively controlled by a main system controller (not shown).

The main system controller and the electrical leads to the controllable components of the waste heat recovery system 100 are not shown in FIG. 1 to reduce the complexity of the figure. However, those skilled in the art will readily appreciate suitable electronics that may be used to control the waste heat recovery system 100. For example, the main system controller may comprise a portion of the vehicle's main electronics. Those skilled in the art can readily appreciate that the electronics can control the various valves that are described further below based on temperature and pressure measurements of the system, for example. So long as the electronics can adequately control the actuation of the various valves discussed below, the particular electronics used is not important for purposes of the claims that follow and thus, should in no way limit the scope of the presently described embodiment.

According to an embodiment, the waste heat recovery system 100 can further include a system drain valve 113. In the embodiment shown, the system drain valve 113 comprises a normally open solenoid actuated valve; however, other types of valves can certainly be used. When de-actuated, the system drain valve 113 can drain the fluid back to the fluid supply 104. This may occur when the vehicle is turned off, when fluid is not desired to be run through the waste heat recovery system 100, or in the event of an emergency, for example.

Moving to the right in FIG. 1, the waste heat recovery system 100 further comprises a valve module 114. According to an embodiment, the valve module 114 can be in parallel with the pressure control valve 110. Therefore, those skilled in the art can readily recognize that while the high-pressure fluid pump 105 may deliver a varying pressure that is higher than the desired threshold pressure to the liquid control module 102, the pressure control valve 110 can ensure that the valve module 114 receives a relatively constant input pressure. The valve module 114 can include one or more fluid inlets 115 and two or more fluid outlets 116, 117. In the embodiment shown, only one fluid inlet 115 is shown. However, in other embodiments, the fluid line 108 may branch off before reaching the valve module 114, and thus, the valve module 114 can include more than one fluid inlet. According to an embodiment, the valve module 114 can include two or more liquid control valves 118, 119. In one embodiment, the two or more liquid control valves 118, 119 can be in the form of proportional valves such as proportional needle valves; however, those skilled in the art will readily recognize other types of valves may be utilized. The proportional needle valves are described in more detail below. According to an embodiment, the valve module 114 can selectively provide a fluid communication path between the fluid supply 104 and one or more of the two or more evaporators 120, 121.

According to an embodiment, the two or more evaporators 120, 121 may receive waste heat generated by the engine 101. For example, in one embodiment, the first evaporator 120 uses the heat from the engine's EGR while the second evaporator 121 uses the heat from the engine's exhaust. A third evaporator, not shown, may receive heat from a third source, such as the charge air circuit. According to an embodiment, the two or more evaporators 120, 121 may be at different temperatures. Therefore, the valve module 114 can control the actuation of the valves 118, 119 based on a measured temperature at the inlet of the vapor control module 103. In addition to the temperature measured at the inlet of the vapor control module 103, pressure sensors 122, 123 may be provided at the outlets 116, 117 of the valve module 114. It should be appreciated however, that the pressure sensors 122, 123 are optional and may be omitted.

Because of the elevated temperature of the two or more evaporators 120, 121, the liquid leaving the valve module 114 can become a superheated vapor. For example, in one embodiment, the valve module 114 can control the two or more valves 118, 119 such that the superheated vapor entering the vapor control module 103 is at approximately 400° C. (752° F.) and 40 bar (580 psi). However, those skilled in the art can readily appreciate that these values may vary based on the particular application and should in no way limit the scope of the present embodiment.

According to the embodiment shown, the two evaporators 120, 121 are in fluid communication with the vapor control module 103 via fluid lines 125, 126, which join prior to an inlet port 127 of the vapor control module 103. With regard to the schematic shown in FIG. 1, it can be seen that the vapor control module 103 can comprise a bypass valve 128. In the embodiment shown, the bypass valve 128 comprises a spring biased, fluid actuated 3/2-way valve. However, those skilled in the art can readily appreciate alternative valve designs that will fall within the scope of the claims that follow.

In the embodiment shown, the bypass valve 128 can selectively provide a fluid communication path between the two or more evaporators 120, 121 and either an expander 129 or a bypass circuit 130. According to an embodiment, the bypass valve 128 can include the inlet port 127, a first outlet port 157, and a second outlet port 158. According to an embodiment, the bypass valve 128 can be biased towards a first position where a fluid communication path is provided between the two or more evaporators 120, 121 and the bypass circuit 130. Therefore, in a default position, the expander 129 is bypassed and waste heat from the engine 101 is not recovered and rather, flows directly to a condenser 134. According to an embodiment, in the first position, the fluid from the two or more evaporators 120, 121 flows through a needle valve 131 and a venturi 132.

In some embodiments, the venturi 132 can receive an optional fluid supply from the liquid control module 102 via a de-superheat control valve 133. Valve 133 is in fluid communication with the fluid line 108 and thus, the fluid supply 104. As can be appreciated, the fluid within the fluid line 108 is pressurized to the threshold pressure, but is not heated yet by the evaporators 120, 121. Therefore, injection of fluid from the fluid supply 104 can cool the superheated vapor flowing through the vapor control module 103 to de-superheat the fluid. As can be seen, the bypass circuit 130 is in fluid communication with the inlet 134' of a condenser 134 via a fluid line 135. Therefore, by injecting the superheated vapor with fluid from the fluid supply 104 and thus, de-superheating the fluid, a substantially cooler fluid can be provided to the condenser 134, which reduces the thermal shock to the condenser 134. The fluid can flow from the condenser 134 back to the fluid supply 104 via a low-pressure pump 150 positioned in the fluid line 136.

A high flow, pressure balanced, non-relieving regulator 200 is also employed between fluid line 135 and the inlet to the condenser 134 in order to limit high pressure from entering and damaging the condenser. Referring to FIG. 2, a preferred embodiment of the pressure limiting valve 200 is a balanced diaphragm valve utilizing a spool mechanism 240.

As shown, valve 200 comprises a housing 210 with upper and lower portions 211, 212 separated by a diaphragm 230. Upper portion 211 accommodates a spring 220 that provides a biasing force F downwards on the diaphragm and has a vent 213 to atmosphere. Lower portion 212 comprises a bore 250 in which slides a spool 240 formed with ports 241 that cooperate with a shoulder 251 in the bore to regulate the flow of working fluid vapour from the valve inlet 270 (connected to fluid line 135) to the valve outlet 260 (connected to condenser inlet 134'). Valve outlet 260 is also in fluid communication with the lower surface 230' of diaphragm 230. Spool 240 and diaphragm 230 are kinematically linked by a stem 242. A hole 243 in the base of the spool 240 allows balancing of the outlet pressure above and beneath the spool.

Condensor inlet pressure on the lower surface 230' of the diaphragm 230 generates a force G that opposes the spring biasing force F, the resultant force moving the spool 240 and its ports 241 relative to bore shoulder 251, thereby regulating flow through the ports. Specifically, when the pressure force G is greater than the biasing force F, the flow limiting element is raised to decrease the size of an orifice that fluidly couples the upstream and downstream fluids. When the pressure force G is less than the biasing force F, the flow limiting element is lowered thereby increasing the size of the orifice that fluidly couples the upstream and downstream fluids. It follows that the performance of the regulator valve is unaffected by the inlet pressure in line 135 and only responds to the outlet pressure in line 134'. In particular, the pressure-balanced spool 240 is unaffected by the inlet pressure in line 135. According to an embodiment, actuating a pilot supply valve 137 and an exhaust valve 138 can actuate the bypass valve 128 from the first position to a second position. The pilot supply valve 137 can supply fluid from the fluid supply 104 to a pilot valve actuator 139 via the fluid line 140. Therefore, the pilot supply valve 137 can selectively provide a fluid communication path between the fluid supply 104 and the pilot valve actuator 139. The fluid supplied to the pilot valve actuator 139 can actuate the bypass valve 128 to a second position. According to an embodiment, in the second position, the bypass valve 128 can selectively provide a fluid communication path between the two or more evaporators 120, 121 and the expander 129. The superheated vapor flows to the expander 129 where it reduces in enthalpy while expanding as is generally known in the art. Therefore, the expander 129 can convert at least some of the energy of the superheated vapor to mechanical work. The expander 129 can comprise a variety of well-known devices, such as a turbine, a piston, a vapor engine, such as a rotary vane type vapor engine, etc. The particular type of expander 129 utilized is not important for purposes of the present description and should in no way limit the scope of the claims that follow. For purposes of the present application, the important aspect of the expander 129 is that it can convert some or a portion of the energy of the superheated vapor into useful mechanical energy. In some embodiments where the expander 129 comprises a vapor engine, for example, the expander 129 can be coupled to the crankshaft or other suitable component of the engine 101 in order to add power to the engine 101 as is generally known in the art. Therefore, in times when the expander 129 is not generating useful power, the engine 101 does not transfer power to the expander 129, which would decrease the engine's efficiency.

According to an embodiment, the fluid can leave the expander 129 and travel to the condenser 134 via the fluid line 135 where the fluid is cooled and delivered back to the fluid supply 104.

The detailed descriptions of the above embodiments are not exhaustive descriptions of all embodiments contemplated by the inventors to be within the scope of the present description. Indeed, persons skilled in the art will recognize that certain elements of the above-described embodiments may variously be combined or eliminated to create further embodiments, and such further embodiments fall within the scope and teachings of the present description. It will also be apparent to those of ordinary skill in the art that the above-described embodiments may be combined in whole or in part to create additional embodiments within the scope and teachings of the present description.

Thus, although specific embodiments are described herein for illustrative purposes, various equivalent modifications are possible within the scope of the present description, as those skilled in the relevant art will recognize. The teachings provided herein can be applied to other waste heat recovery systems, and not just to the embodiments described above and shown in the accompanying figures. Accordingly, the scope of the embodiments described above should be determined from the following claims.

We claim:

1. A waste heat recovery system (100) for an engine (101), comprising:
    a fluid supply (104);
    one or more evaporators (120, 121) adapted to transfer waste heat from the engine (101) to fluid from the fluid supply (104) to heat the fluid to a superheated vapor;
    a condenser (134) having a condenser inlet (134') in fluid communication with the one or more evaporators; and
    a pressure regulator (200) configured to limit the vapor pressure at the condenser inlet (134'), the pressure regulator (200) comprising a valve housing (210) having a valve inlet (270) in fluid communication with the one or more evaporators, a valve outlet (260) in fluid communication with the condenser and therebetween a valve member (240) moveable relative to the valve housing (210) in response to the pressure at the valve outlet (260), and a diaphragm (230) kinematically connected to the valve member and subject to the pressure at the valve outlet;
    wherein one side of the diaphragm (230) is subject to the pressure at the valve outlet (260) while the opposite side is subject to ambient pressure.

2. The waste heat recovery system of claim 1, wherein the valve member (240) is pressure balanced relative to the valve housing (210).

3. The waste heat recovery system of claim 2, wherein the valve member (240) is balanced by the pressure at the valve outlet (260).

4. The waste heat recovery system of claim 1, wherein the valve member is a spool (240) and the valve housing (210) comprises a bore 250 to accommodate the spool (240) for sliding movement.

5. The waste heat recovery system of claim 4, wherein the bore (250) has at least one shoulder (251) and the spool (240) has at least one port (241) moveable relative thereto to regulate vapour flow through the valve.

6. The waste heat recovery system of claim 4 or claim 5, wherein the spool (204) has a passageway (243) to balance the pressure across the spool in its direction of movement.

7. The waste heat recovery system claim 1, wherein the valve member (240) is subject to a bias force (F) in opposition to the valve outlet (260) pressure.

8. The waste heat recovery system of claim 7, wherein pressure regulator comprises a spring (220) configured to apply a bias force (F) to the valve member (240).

* * * * *

UNITED STATES PATENT AND TRADEMARK OFFICE
CERTIFICATE OF CORRECTION

PATENT NO. : 9,932,863 B2
APPLICATION NO. : 14/895853
DATED : April 3, 2018
INVENTOR(S) : John Michael Morris and Mark Edward Byers Sealy It is certified that error appears in the above-identified patent and that said Letters Patent is hereby corrected as shown below:

On the Title Page

(72) Inventors: replace "Mark Edwards Byers Sealy" with --Mark Edward Byers Sealy--

Signed and Sealed this
Second Day of October, 2018

Andrei Iancu
*Director of the United States Patent and Trademark Office*